Dec. 9, 1958 J. V. SCHURMAN 2,863,888
PROCESS FOR THE PRODUCTION OF FATTY ACID HYDROXY AMIDES
Filed Sept. 28, 1954
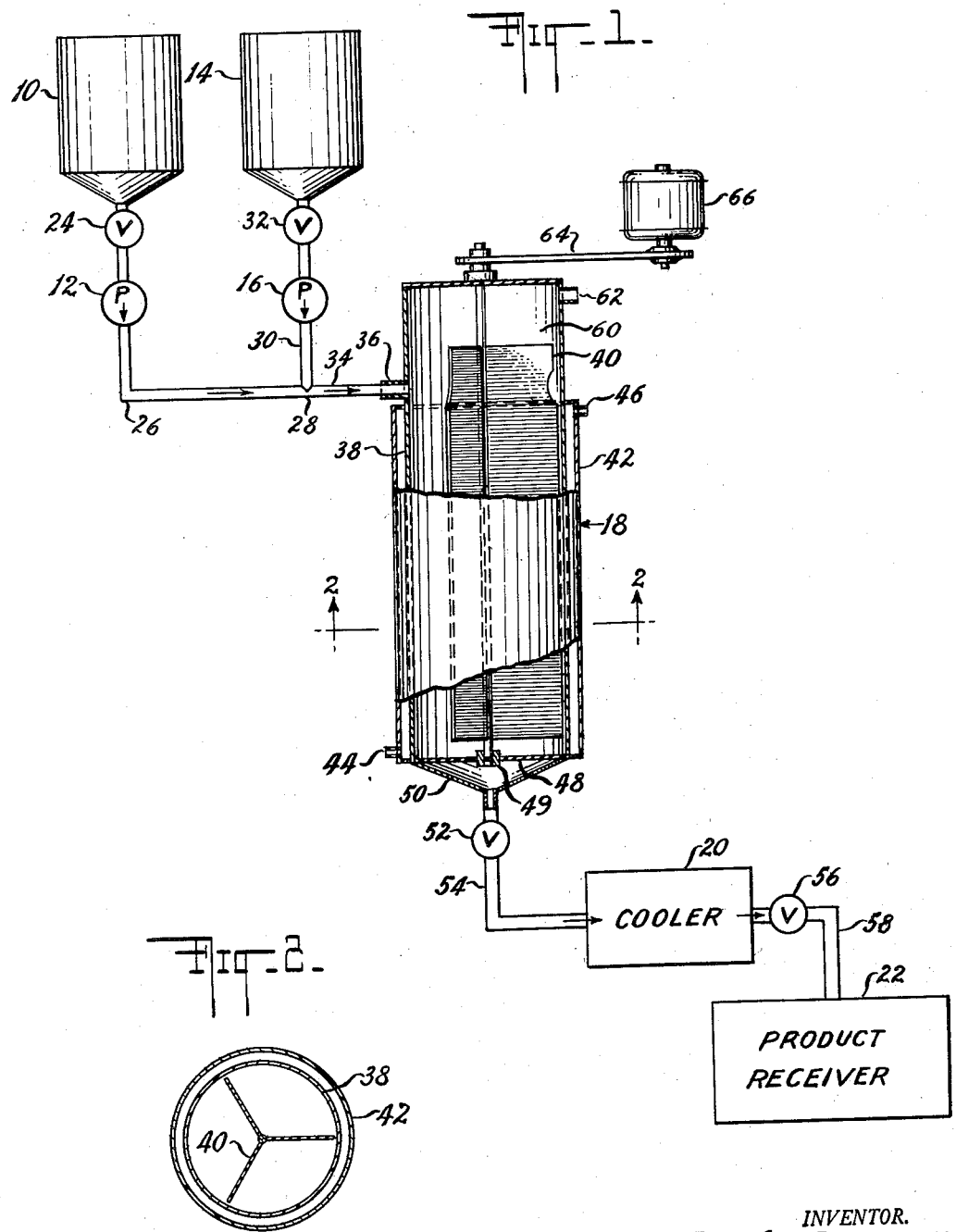
INVENTOR.
JACK VAIR SCHURMAN
BY
*George H. Mortimer*
ATTORNEY

United States Patent Office 2,863,888
Patented Dec. 9, 1958

2,863,888

PROCESS FOR THE PRODUCTION OF FATTY ACID HYDROXY AMIDES

Jack Vair Schurman, Caldwell, N. J., assignor to Colgate-Palmolive Company, Jersey City, N. J., a corporation of Delaware Application September 28, 1954, Serial No. 458,754

10 Claims. (Cl. 260—404)

The present invention relates to the production of fatty acid hydroxy amides and has particular reference to a continuous process for the manufacture of fatty acid hydroxy amides of high purity which are useful as surface active agents.

Heretofore, it has been proposed to prepare fatty acid hydroxy amides batchwise by treating a liquid portion of a fatty ester with an immiscible liquid portion of a suitable amidating agent in the presence of a catalyst comprising an alkali metal, its alcoholoxide or amide, and reacting the resultant mixture at about 100° C. The presence of water is said to be unfavorable in this process since it allows the catalyst to be destroyed by saponification of the ester, but effects of the presence of small amounts of water may usually be overcome by the use of added catalyst.

It has also been recognized by the prior art that the products produced by reacting certain fatty acylating materials with hydroxy-alkyl amidating agents are mixtures comprising amides and ester-amides.

It has now been found that fatty acid hydroxy amides prepared according to the above proposed catalytic process contain widely varying amounts of ester-amides, usually a fatty acid monoester of the desired fatty acid hydroxy amide, and that contamination of the fatty acid hydroxy amide by such ester-amide by-products is highly undesirable in that these ester-amides have a very deleterious effect on the foaming ability of detergent compositions containing such fatty acid hydroxy amides. It has now also been found that products of surprisingly high purity and freedom from such ester-amide by-products may be formed by operating the primary amidation reaction under certain related conditions of temperpature, catalyst concentration and time of exposure to elevated temperatures so as to yield a cooled product containing at least about 0.05% by weight free catalyst calculated as alkali metal. Apparently this level of free catalyst enables rapid attainment of a low-temperature equilibrium in an hydroxy-amide-ester-amide side reaction which is believed to occur according to the following reversible reaction.

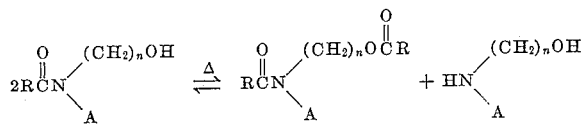

where

is a fatty acyl radical
$n$ is an integer, and
A is a hydrogen, alkyl or hydroxy-alkyl radical.

This production of ester-amide occurs as a side reaction during the primary amidation reaction and is catalyzed by those catalysts which are used for the primary amidation reaction. It has now been found, for example, that in certain cases the equilibrium between hydroxy-amide and ester-amide is such as to form 15% of the undesirable ester-amide at 74° C., and considerably greater amounts at higher temperatures. However, operation so as to yield a cooled product containing at least 0.05% free catalyst on an alkali metal basis has the beneficial effect of producing a product containing a surprisingly low amount of ester-amide, apparently due to a favorable low-temperature equilibrium in the ester-amide producing side reaction. As can also be determined from the equation written above, the formation of the ester-amide by-product may be reduced by use of excess hydroxyalkyl amidating agent in the primary amidation reaction.

The present process provides a method whereby there is a surprising reduction in catalyst destruction during the high temperature amidation reaction as compared to the destruction which occurs during the relatively lengthy batch process of the prior art. This reduction in catalyst destruction diminishes the amount of catalyst which must be used to successfully catalyze both the primary amidation reaction occuring at high temperatures and the achievement of the desired low temperature equilibrium between hydroxy-amide and ester-amide, and thereby not only lessens the expense for catalyst and the handling of highly reactive material, but a more important advantage of this invention is that it provides a means of producing a product of a low ultimate soap content if so desired. This is so because it has now been found that all of the alkali metal of the catalyst ultimately will be deactivated by forming fatty acid soap, the rate of soap formation being proportional to the temperature and moisture content of the materials in contact with the catalyst. As a result of the high rate of alkali metal soap formation at elevated temperatures and the fact that in the order of 10 parts by weight of soap form from one part by weight of alkali metal, a product made by the batch process of prior art must have a relatively high initial catalyst content in order to achieve a cooled product containing at least about 0.05% free catalyst on an alkali metal basis, or else the size of the batch must be impractically small in order to obtain the benefits of a relatively short exposure to elevated temperatures.

In accordance with the present invention liquid fatty acid ester is mixed with liquid hydroxy-alkyl amine amidating agent and these materials are then reacted in the presence of a catalyst selected from the group consisting of alkali metals, alkali metal alkoxides and alkali metal amides at temperatures of from about 70° C. to 175° C., for a period of time insufficient to convert said catalyst entirely to soap, and the reaction product is then cooled to a temperature below about 55° C. sufficiently rapidly to yield a cooled product containing at least about 0.05% free catalyst calculated as alkali metal. The fatty acid ester and hydroxy-alkyl amine my be premixed batchwise and fed continuously through a reaction chamber, or separate streams of the liquid reactants may be pumped at proper relative rates into confluence at or near the reaction chamber.

Fatty acid esters suitable for amidation in accordance with the present invention include esters of alcohols containing up to about five carbon atoms. Esters representative of those which may be used are the fatty acid esters of mono- and polyhydric alcohols such as methanol, ethanol, isopropanol, 1-butanol, ethylene glycol, propylene glycol and glycerol. It is preferred to run the amidation reaction under vacuum and to use esters of relatively volatile alcohols, such as the lower monohydric alcohols containing up to 3 carbon atoms, e. g. methanol and ethanol, because in such a case the alcohol liberated during the course of the amidation reaction may conveniently be distilled out of the reaction mass. Such distillation is facilitated by operation of the present process at absolute pressures of less than one atmosphere, preferred absolute operating pressures being dependent on the particular reactants and products employed, but being generally within the range of 1 to 20 inches of mercury.

The fatty acid radical of the esters which may be amidated by the process of the present invention include those derived from fatty acids containing about 10 to 22 carbon atoms and mixtures thereof. Representative of such fatty acids are capric, lauric, myristic, palmitic, stearic, linoleic, oleic, arachidic and behenic acids and those acids derived from naturally occurring products such as coconut, palm kernel, babassu, palm, fish, linseed, sperm, soy bean, olive, and cottonseed oils, grease, tallow, and their hydrogenation products.

The amidating agents suitable for use in the present invention include those hydroxy-alkyl amines which have an alkyl group joining at least one esterifiable hydroxy group to a nitrogen atom to which there is attached at least one replaceable hydrogen atom. Among the representative hydroxy-alkyl amines which may be used are, for example, monoethanolamine, monopropanolamine, dipropanolamine, dibutanolamine, monobutanolamine, monoisobutanolamine, mono- and dipentanolamine, mono- and dihexanolamine, mono- and dioctanolamine, monolaurylolamine, monohexadecylolamine, monoethyl ethanolamine, mono-octadecylolamine, monobutyl ethanolamine, cyclohexyl ethanolamine, ethanolaniline, 2-methyl-amine-propane-diol-1,3, 1-phenylamine-propane-diol-2,3, 1-hydroxy-ethylamine-2,-methoxy-propan-ol-3, diglycerol monoamine, diglycerol diamine, and the like. It is a preferred embodiment of the invention, however, to use those hydroxy-alkyl amines having up to 4 carbon atoms in each alkyl radical, such as monoethanolamine, diethanolamine and monoisopropanolamine for example. The amidating agent is introduced in an amount equal to or in slight excess of the molar amount of fatty acid ester employed, preferred mole ratios of amidating agent to ester being within the range of about 1.05:1 to 1.3:1.

The catalyst employed in the process of the present invention is selected from the group consisting of alkali metals, alkali metal alkoxides and alkali metal amides. It is of course within the scope of the invention to employ materials capable of reacting with hydroxy-alkyl amines to form alkali metal alkoxides and/or amides. Thus the catalyst may conveniently be prepared by mixing a highly concentrated aqueous alkali metal hydroxide, such as potassium hydroxide, with the hydroxy-alkyl amine which is to be used as a reactant and subjecting the mixture to heat and high vacuum so as to distill off water or by simply mixing solid anhydrous alkali metal hydroxide with the hydroxy alkyl amine.

As is known in the art, the more water there is contained in the reactants, the higher the required catalyst concentration, probably because of the particularly rapid formation of alkali metal soap which occurs in the presence of water. Since the rate of formation of soap increases with rising temperatures, it is not advisable to preheat a mixture of reactants for any considerable period of time before bringing them into the range of temperatures used for the amidation process. The amount of catalyst to be employed must be such as to provide a fatty acid hydroxy amide product containing a minimum of at least about 0.05% by weight free catalyst calculated as alkali metal. Where contamination of the product by soap is not objectionable, relatively large amounts of catalyst may be employed, e. g. about 1% by weight of the reactants, but since one part by weight of sodium produces 12 parts by weight of sodium palmitate for example, it is normally desirable to mix with the reactants the minimum usable amount of catalyst which will enable the production of a product containing at least about 0.05% by weight free alkali metal catalyst. Such initial catalyst concentrations vary depending upon the particular materials involved in the reaction, the water content thereof, the concentrating effect of the removal of volatile reaction products, and other factors. Thus, it has been found that under certain conditions, including the removal of a volatile product such as methanol, the present process may be operated with as little as about 0.05% catalyst calculated as alkali metal based on the reactants, and that as a result of the concentrating effect of the removal of the methanol, the cooled products contain as much as 0.05% by weight of active catalyst in addition to the soap which has formed during the reaction.

In order to indicate more specifically the advantages and capabilities of the novel process of the present invention, reference is made to the following description, taken in conjunction with the accompanying drawing, which by way of illustration, indicates a preferred form of apparatus for carrying out the present invention, and in which:

Figure 1 shows diagrammatically the various component parts of a preferred apparatus for carrying out the process of the present invention; and Figure 2 is a section taken on line 2—2 of the thin film heater of Figure 1.

Referring now to both Figures 1 and 2, there is provided a supply vessel 10 which is adapted to hold a previously prepared substantially anhydrous mixture of hydroxy-alkyl amine amidating agent and catalyst. A valve 24 and a proportioning pump 12 control the rate of flow of this mixture through a conduit 26 which communicates the hydroxy-alkyl amine supply vessel 10 with a T 28. In a similar manner, a supply vessel 14 which is adapted to hold fatty ester is communicated with a second arm of said T 28 by means of a conduit 30, the rate of flow of fatty ester through said conduit 30 likewise being controlled by a valve 32 and proportioning pump 16. From said T 28, the point of confluence of the streams of fatty ester and the mixture of amidating agent and catalyst, the resulting mixture is carried by a conduit 34 which communicates the third arm of said T 28 with the feed point 36 of a vertical thin film reactor 18.

The reactor 18 comprises essentially a closed vertically elongated tube 38 containing a concentrically mounted rapidly rotating vaned agitator 40 which forces the liquid contents of the reactor against the inner wall of said vertically elongated tube 38, thus spreading the liquid in a thin film and maintaining the liquid in rapid movement so as to insure intimate mixing, efficient heat transfer and prevent burning. The portion of the vertical tube 38 below the feed point 36 of the reactor 18 is provided with a jacket 42 through which a heating medium is passed, the heating medium entering and leaving said jacket by means of taps 44, 46 at the base and top thereof. The liquid content of the reactor flows down the inside surface of the tube 38, through a spider 48 which carries a foot bearing 49 for the vaned agitator 40, and collects in a conical base 50 which is attached to and seals the bottom of said tube. Liquid reaching the conical base 50 passes through a valve 52, is carried by a conduit 54 to a cooler 20 which may be a water cooled tube-and-shell type heat exchanger, and thence passes through a valve 56 and is carried by a conduit 58 to a product receiver 22.

The portion of the vertical elongated tube 38 above the feed point 36 forms a separation chamber 60 for recovery of liquid entrained in any escaping evaporate. A conduit 62 which communicates with the separation chamber 60 is connected to a source of vacuum so as to facilitate removal of vapors from the reactor 18. The vaned agitator 40 is rotated by a belt drive system 64 powered by an electric motor 66.

In operation streams of (1) the previously prepared mixture of hydroxy-alkyl amine amidating agent and the desired proportion of catalyst and (2) fatty ester are pumped to the point of confluence 28 by proportioning pumps 12 and 16 which are operated so as to deliver the two streams at desired absolute and relative flow rates, the reactants preferably being commingled in such a manner that about 1.05 to 1.3 moles of hydroxy-alkyl amine amidating agent are pumped for each mol of fatty ester. The proportion of catalyst which must be employed to provide a minimum concentration of catalyst in the cooled product of about 0.05% by weight of the reactants based on alkali metal may vary as described previously. Although best determined by routine test, it normally will be above about 0.1% by weight of the reactants on an alkali metal basis. In the event a volatile alcohol is liberated during the reaction, it rises through the spaces between the vanes of the rotor 40 and leaves the reactor 18 by means of conduit 62.

The heating jacket 42 is supplied by means of its upper tap 46 with steam at the desired operating temperature, condensate being removed by means of a stream trap (not shown) connected to the lower tap 44 of the heating jacket. Alternatively, hot water may be used as the heating fluid by passing it upwardly through the jacket 42.

The residence time of the reactants in the thin film reactor 18 is from about 10 to 60 seconds, preferably about 10 to 30 seconds. Immediately on leaving the base 50 of the thin film reactor 18 the product is carried by a conduit 54 to a cooler 20 wherein said product is cooled to a temperature below 55° C. Thus relatively small masses of material are continuously being rapidly heated to reaction temperature and then are maintained at such elevated temperatures for periods of time of extremely short duration.

By this process there is continuously produced fatty acid hydroxy amide of high purity, i. e. 85% or higher in hydroxy amide, of consistently low ester-amide content, and if desired, of exceptionally low ultimate soap content since catalyst degradation during processing is a minimum.

In order to indicate even more fully the advantages and capabilities of the novel process of the present invention, the following specific examples are set forth. These examples are presented for illustrative purposes only and they are not intended to limit the scope of the invention in any manner.

EXAMPLE I 440.7 parts by weight of diethanolamine (about 0.3% water), 876.5 parts by weight of methyl laurate and 42.5 parts by weight of 25% sodium methylate are premixed at about 33° C. and kept thoroughly blended by agitation as the mixture is run continuously at about 10 parts by weight per minute through a reaction chamber having a heated wall down which the mixture flows as a thin film. The exit temperature of the reaction product is about 125° C.±5° C., and the time of passage through the reaction chamber is of the order of less than a minute. The liberated methanol is removed from the reaction chamber into a condenser connected to a vacuum system which maintains the pressure in the chamber at about 4 inches of mercury. On leaving the reaction chamber the product is cooled quickly below 55° C. Analysis shows the product initially contains about 0.2% free catalyst calculated as sodium metal and about 7.5% ester. After four days the ester content is about 5.2%.

EXAMPLE II

A stream of methyl laurate containing less than about 0.2% moisture is continuously commingled with a stream consisting of diethanolamine and catalyst, the streams being mixed in such proportions that about 1.05 moles of diethanolamine are introduced for each mole of methyl laurate. The stream consisting of diethanolamine and catalyst is prepared by stripping water from a mixture of diethanolamine and aqueous potassium hydroxide by subjecting said mixture to an absolute pressure of 0.4 inch of mercury at a temperature of about 100° C. until the water content of the mixture is 0.1% or less. The proportion of potassium hydroxide is such as to provide potassium in an amount about 0.5% of the weight of the reactants. The mixture of reactants is continuously introduced into a thin film reactor wherein the average residence time of the contents of the reactor is about 20 seconds. The thin film reactor is operated at a temperature of about 150° C. and at an absolute pressure of about 4½ inches of mercury. Methanol distills off as a vapor. The liquid product leaving the reactor is rapidly cooled to a temperature of about 35° C., and thereafter is stored at a temperature of about 20° C. The N(bis 2-hydroxy ethyl) lauramide thus produced (sometimes referred to as lauric diethanolamide) contains about 2.4% by weight of ester-amide within 2 hours of cooling. Ultimately all of the catalyst will be converted to soap, however analyses made 24 hours after cooling indicate that the products contain, on an average, about 0.2% free catalyst as potassium metal, about 0.1% potassium metal as soap, approximately 3% free diethanolamine, and less than about 1% ester-amide. The remainder is N(bis 2-hydroxy ethyl) lauramide. In the place of diethanolamine, monoethanolamine or monoisopropanolamine may be employed to produce the corresponding hydroxy amides.

EXAMPLE III

A stream of methyl laurate is continuously commingled with a stream consisting of diethanolamine and an alcoholic solution of sodium methylate. The streams are commingled in such proportions that about 1.3 moles of diethanolamine are introduced for each mole of methyl laurate. The sodium methylate catalyst is employed in a proportion such as to provide sodium in an amount about 0.07% of the weight of the reactants. The resulting mixture of reactants and catalyst is continuously introduced into a thin film reactor maintained at a temperature about 120° C. and an absolute pressure about 14.9 inches of mercury. The materials pass through the reactor in less than about 30 seconds, the methanol distills off as a vapor, and the liquid product leaving the reactor is immediately cooled to room temperature. The liquid products leaving the reactor contains about 0.07% by weight free catalyst calculated as alkali metal. After aging for about three weeks, the N(bis 2-hydroxy ethyl) lauramide product contains about 0.4% esteramide, about 9% free diethanolamine, about 0.035% unsaponified alkali metal, and about 0.33% sodium soap. The remainder is N(bis 2-hydroxy ethyl) lauramide.

This example illustrates the production of fatty acid hydroxy amides of exceptionally low ester-amide and ultimate soap content.

EXAMPLE IV

The process of Example III is repeated employing sodium methylate catalyst in a proportion such as to provide alkali metal in an amount about 0.14% of the weight of the reactants. After aging about three weeks, the product contains about 0.2% esteramide, about 9.6% free diethanolamine, about 0.09% unsaponified alkali metal and about 0.55% sodium soap. The remainder is N(bis 2-hydroxy ethyl) lauramide. In the place of methyl laurate, the ethyl esters of coconut or palm oils may be utilized to produce the corresponding fatty acid hydroxy amides.

EXAMPLE IV

A stream of methyl laurate is continuously commingled with a stream of diethanolamine and an alcoholic solution of sodium methylate. The streams are commingled in such proportions that about 1.1 moles of diethanolamine are introduced for each mol of methyl laurate. The proportion of sodium methylate catalyst employed is varied as shown by Table I below. The resulting mixture of reactants and catalyst is continuously introduced into a thin film reactor maintained at a temperature about 150° C. and an absolute pressure of about 4 to 6 inches of mercury. The materials pass through the reactor in less than about 30 seconds, the methanol distills off as a gas, and a liquid product leaving the reactor is immediately cooled to room temperature. The table below lists the active catalyst content, the ester-amide content, and the diethanolamine content of the materials immediately after cooling to room temperature. Also given in Table I is the analysis of the product after it has been aged for several days at room temperature. All figures represent percentages by weight of the product unless otherwise noted.

*Table I*

| Catalyst Weight Percent of Starting Materials | Free Catalyst | | Ester-Amide | | Diethanolamine | | Soap Sodium Laurate | N (bis 2-Hydroxy Ethyl) Lauramide |
|---|---|---|---|---|---|---|---|---|
| | Initially | On Aging | Initially | On Aging | Initially | On Aging | | |
| 0.19 | 0.18 | 0.16 | 24.6 | 3.6 | 5.27 | 4.74 | 0.43 | 90.95 |
| 0.12 | 0.09 | 0.10 | 17.4 | 2.1 | 4.95 | 4.54 | 0.19 | 93.00 |
| 0.12 | 0.09 | 0.06 | 25.0 | ¹0 | 4.00 | 2.13 | 0.51 | 97.25 |
| 0.11 | 0.09 | 0.05 | 22.7 | ¹0 | 3.93 | 2.54 | 0.57 | 96.81 |
| 0.06 | 0.06 | 0.04 | 44.4 | 7.4 | 5.71 | 2.51 | 0.40 | 89.62 |
| 0.05 | 0.05 | 0.03 | 39.1 | 8.3 | 5.59 | 2.91 | 0.44 | 88.29 |

¹ Contains less than about 1%, the lower limit of the analytical method.

In a similar run except that only 0.03% catalyst is used, the free catalyst initially and on aging analyzes 0.006%, the ester-amide on aging is 26.4%, the diethanolamine 6.84% initially and 3.69% on aging, the soap is 0.12% and the N(bis 2-hydroxy ethyl) lauramide is only 69.88%. This comparison illustrates the criticality of the lower limit of the catalyst and the unsatisfactory results obtained when there is a departure from the processing conditions of the present invention.

Having thus described the invention, what is claimed is:

1. A continuous process for the preparation of fatty acid hydroxy amides of low ester-amide content which comprises mixing liquid fatty acid ester of an alcohol containing up to about 5 carbon atoms with liquid hydroxy-alkyl amine, reacting said ester and amine in the presence of from 0.05% to 1% by weight based on alkali metal a catalyst selected from the group consisting of alkali metals, alkali metal alkoxides, and alkali metal amides at temperatures within the range from about 70° C. to 175° C., and immediately cooling the reaction product to a temperature below about 55° C., said cooled product containing at least about 0.05% by weight free catalyst calculated as alkali metal.

2. A continuous process for the preparation of fatty acid hydroxy amides of high purity as set forth in claim 1 wherein said hydroxy-alkyl amines contain up to 4 carbon atoms in each alkyl radical therein.

3. A continuous process for the preparation of fatty acid hydroxy amides of high purity as set forth in claim 1 wherein said esters are fatty acid esters of lower monohydric alcohols containing up to 3 carbon atoms.

4. A continuous process for the preparation of fatty acid hydroxy amides of high purity as set forth in claim 3 wherein said process is carried on at an absolute pressure of less than one atmosphere.

5. A continuous process for the preparation of fatty acid hydroxy amides of high purity which comprises flowing a liquid stream of fatty acid ester into confluence with a liquid stream of hydroxy-alkyl amine, said stream of hydroxy-alkyl amine being introduced in slight molar excess of the amount of fatty acid ester being introduced, reacting said ester and amine in the presence of from 0.05 to 0.19% by weight based on alkali metal; a catalyst selected from the group consisting of alkali metals, alkali metal alkoxides, and alkali metal amides at temperatures of about 70° C. to 175° C. for a period of from 10 to 60 seconds and immediately cooling the reaction product to a temperature below about 55° C., said cooled product containing at least about 0.05% by weight free catalyst calculated as alkali metal.

6. A continuous process for the preparation of fatty acid hydroxy amides of high purity which comprises flowing a liquid stream of fatty acid ester into confluence with a liquid stream of hydroxy-alkyl amine, said streams being introduced in such proportions that the molar ratio of said amine to fatty acid ester is within the range of 1.05:1 to 1.3:1, reacting said ester and amine in the presence of from 0.05 to 0.12% by weight based on alkali metal a catalyst selected from the group consisting of alkali metals, alkali metal alkoxides, and alkali metal amides at temperatures within the range from about 70° C. to 175° C. for a period of from 10 to 60 seconds, and immediately cooling the reaction product to a temperature below about 55° C., said cooled product containing at least about 0.05% by weight free catalyst calculated as alkali metal.

7. A continuous process for the preparation of fatty acid hydroxy amides of high purity which comprises flowing a liquid stream of fatty acid ester into confluence with a liquid stream of hydroxy-alkyl amine, said streams being introduced in such proportions that the molar ratio of said amine to fatty acid ester is within the range of 1.05:1 to 1.3:1, intimately mixing and reacting said ester and amine in the presence of from about 0.05 to 0.12% by weight based on alkali metal a catalyst selected from the group consisting of alkali metals, alkali metal alkoxides, and alkali metal amides at temperatures from about 70° C. to 175° C. for about 10 to 30 seconds, and immediately cooling the reaction product to a temperature below about 55° C. to yield a cooled product containing at least about 0.05% by weight free catalyst calculated as alkali metal.

8. A continuous process for the preparation of N(bis 2-hydroxy ethyl) lauramide which comprises flowing a liquid stream of methyl laurate into confluence with a liquid stream of diethanolamine, said diethanolamine being introduced in slight molar excess of the methyl laurate, reacting said methyl laurate and diethanolamine in the presence of from 0.05 to 0.12% by weight calculated as alkali metal a catalyst selected from the group consisting of alkali metal, alkali metal alkoxide, and alkali metal amide at temperatures within the range from about 70° C. to 150° C. for a period of about 10 to 30 seconds, and immediately cooling the N(bis 2-hydroxy ethyl) lauramide thus produced to a temperature below about 55° C., said cooled product containing at least about 0.05% by weight free catalyst calculated as alkali metal.

9. A continuous process for the preparation of N(2 hydroxypropyl) lauramide which comprises flowing a liquid stream of methyl laurate into confluence with a liquid stream of monoisopropanolamine, said monoisopropanolamine being introduced in slight molar excess of the methyl laurate, reacting said methyl laurate and monoisopropanolamine in the presence of from 0.05 to 0.12% by weight calculated as alkali metal of a catalyst selected from the group consisting of alkali metals, alkali metal alkoxides, and alkali metal amides at temperatures of from about 70° C. to 150° C. for a period of 10 to 30 seconds, and immediately cooling the N(2 hydroxypropyl) lauramide thus produced to a temperature below about 55° C., said cooled product containing at least about 0.05% by weight free catalyst calculated as alkali metal.

10. A continuous process for the preparation of the N(bis 2-hydroxy ethyl) derivative of coconut oil fatty acid amide which comprises flowing a liquid stream of methyl cocate into confluence with a liquid stream of diethanolamine, sad diethanolamine being introduced in slight molar excess of the methyl cocate, reacting said methyl cocate and diethanolamine in the presence of from 0.05 to 0.12% by weight calculated as alkali metal of a catalyst selected from the group consisting of alkali metals, alkali metal alkoxides, and alkali metal amides at temperatures of from about 70° C. to 150° C. for a period of 10 to 30 seconds, and immediately cooling the N(bis 2-hydroxy ethyl) derivative of coconut oil fatty acid amide thus produced to a temperature below about 55° C., said cooled product containing at least about 0.05% by weight free catalyst calculated as alkali metal.

References Cited in the file of this patent

UNITED STATES PATENTS

| | | |
|---|---|---|
| 2,429,445 | Young et al. | Oct. 21, 1947 |
| 2,464,094 | Meade | Mar. 8, 1949 |